J. G. Ross,
Water Wheel,
Nº 3,816. Patented Nov. 9, 1844.
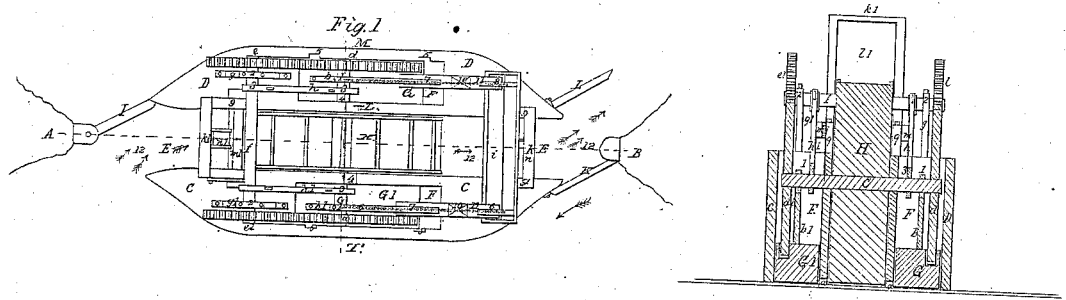
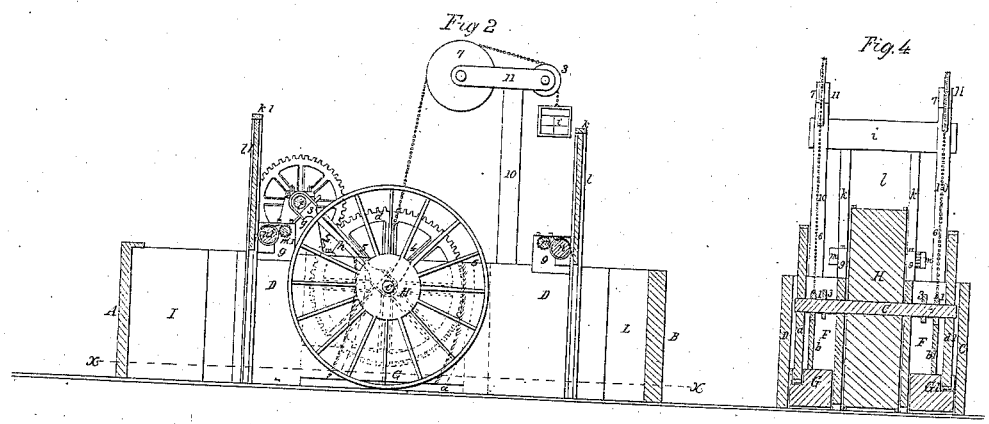
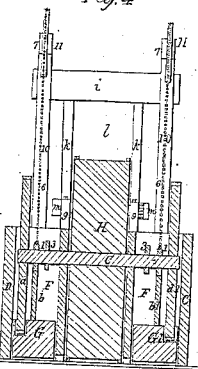
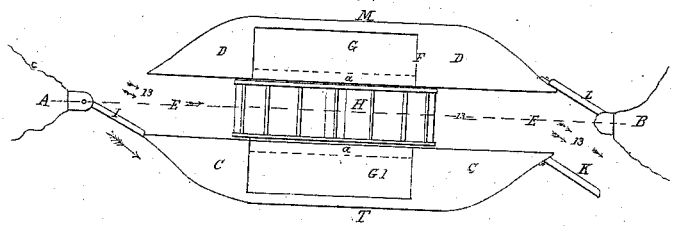
John Gerard Ross

UNITED STATES PATENT OFFICE.

JOHN G. ROSS, OF NEW YORK, N. Y.

TIDE-WHEEL.

Specification of Letters Patent No. 3,816, dated November 9, 1844.

*To all whom it may concern:*

Be it known that I, JOHN GERARD ROSS, of the city, county, and State of New York, model-maker and machinist, have invented and made certain new and useful improvements in the mechanical arrangement, application, and combination of the parts employed in what is technically known as the "tide-mill," the intent and effect of such improvements being that such mills shall be able to work with less loss of time and be more equally and continuously effective than by any arrangement now in use to my knowledge by arranging the wheel-race and tide-gate, so that the current into and out of the mill-pond shall always run one way in the race, whether the tide be rising or falling, and the wheel or wheels are made to rise and fall with the water so that no interruption of the power occurs except for a short time at the high and low water of each tide; these improvements I designate collectively as "Ross's plemaian" or "constant tide-mill," and for the same I seek Letters Patent of the United States; and further know ye that the said improvements and the mode of constructing, arranging, applying, and combining the same are fully and substantially set forth and shown in the following description and in the drawings annexed to and making a part of this specification, wherein—

Figure 1, is a plan of all the parts in place for use; Fig. 2, is a sectional elevation, lengthwise in the line A, B, Fig. 1; Fig. 3, is a cross sectional elevation of the parts, at the end A, of Figs. 1, and 2, seen, as if cut through the wheel; Fig. 4, is a cross sectional elevation of the parts at the end B, of Figs. 1, and 2, seen likewise, as if cut through the wheel; Fig. 5, is a plan of the wheel race, water or tide gate, and parts near the foundation of the dam walls, and wheel race, and below the line $x$, $x$, Fig. 2, and the same letters numbers and other marks of reference, apply to the like parts, in all the several figures.

C, is the outer dam wall, next the tide, on open space of tide water T; D, is the inner dam wall, next the mill pond or inclosed space M; these walls C, and D, together form the wheel race E, and as will be seen hereafter, may be made of any length, to inclose a space as a mill pond, and may work any number of wheels, that the length will conveniently receive: In each of these walls, on each side the wheel race, abreast of or at the side of each wheel, the walls are to be built so as to form a pit, or opening F, from the surface, down to the foundation, but constructed with openings in the base, next the race at $a$, see the Figs. 2, 3, and 4, to admit the rise and fall of the tide, in the pits F, for the purpose of floating the caissons G, G', at the level of the tide water, these may be made of wood, or metal, or both, of a proper size to float, and thereby maintain a uniform height, above the water in the centers of the standards or frames $b$, $b'$, these are secured in any convenient way on the caissons G, G', and are fitted with journal boxes 1, 1, at a proper or proportional height, to receive the shaft $c$, of the main tide wheel H, and a curved opening at 4, shown by dotted lines in Fig. 2, as cut into the inner pit walls, allows the shaft $c$, to rise and fall with the tide, in the proper line of motion: On each outer end of the shaft $c$, is a spur wheel $d$, or $d'$, these respectively gear into driving wheels $e$, $e'$, on the ends of a shaft $f$, see Figs. 1, 2, and 3, which is mounted on journal boxes 2, 2, on standards $g$, $g'$, securely fitted on the solid walls of the dam; Two radius bars $h$, $h'$, are connected by boxes, straps, gibs, and keys 3, 3, to the shafts $c$, and $f$, and maintain the proper relative positions between the centers of the shafts $c$, and $f$, and wheels H, $d$, and $e$, these bars $h$, $h'$, may be best made, with right and left handed screws in the ends, taking into similar nuts, in the stocks to which the boxes and straps are fitted, but any other convenient means may be used, that will maintain the proper adjustments of the gearing and working parts. To secure the proper position of the caissons G, G', at each period of the tide, two circular grooves 5, 5, shown in Fig. 1, in place, and by dotted lines in Fig. 2, as made in the outer side of the pit wall are fitted to receive studs $o$, or blocks, carrying rollers on the corresponding parts of the caissons, see the detached Fig. 6, where these are shown, sectionally, in place in the pit and wall, the grooves 5, must be segments of circles, whose common center may be found by the intersection of two rectangular lines, from the bisection of straight lines, to, and from, the upper and lower halves of the line of motion, in the caisson. Two standard posts 10, Figs. 1, 2, and 4, carry a head block 11, in which two large pulleys 7, and two small pulleys 8, receive chains 6, 6, secured one end by an eye to the standards b, b', and passing over the pulleys 7, and 8 terminate, each, in an eye on a box i, containing a mass of heavy matter, sufficient to counterpoise the caissons and wheel, and their equipments, in such a way, that the rise and fall of the tide shall have a regular and equal effect on the main wheel H; the frames k, k', at either end of the race, form slides for flood gates l, l, to shut out the water, for adjustment, or repairs, and these gates are connected by chains x, see Figs. 1 and 2, going over roller sheaves n, n', to winches m, m', fitted with proper ratchets and pawls, and mounted in standards q, on the race walls C, and D.

The method of giving a current in the same direction on both the flood and ebb tide is now to be described. The single tide gate I, Fig. 1, is shown, in this figure, as hung to a competent support in the bank or wall at A, Fig. 1, and closed against the inner dam wall D, admitting the current of the rising, or flood tide, from the tide side T, of the dam wall C, to run through the race E, and carry the wheel H, in the direction shown by the arrows 12; the outer current gate K, is shown, shut, from the outer dam wall C, to a shutting jamb fitted to receive it in the bank or wall at B, Fig. 1, where it is kept, by the pressure, caused by the external, or tide water, at T, being higher than that in the mill pond at M, the inner current gate L, being open, to pass the water from the race to the pond M, so that the current, running through the race E, carries the wheel H, as shown by the arrows 12, Fig. 1, and fills the pond M, supplying a water power to run out, when the external tide falls; in Fig. 5, the single tide gate I, is shown shut, against the outer dam wall and forcing the water from the pond side M, of the dam wall D, to pass out, as the tide falls, in the direction of the arrows 13, the inner current gate L is shown as closed, to prevent the water in the pond, passing by that end of the inner dam, and will remain shut, by the internal water, so long as that in the pond M, is higher, than the external, or falling tide water, at T, and the outer current gate K, is shown as open, to pass the water from the race, to the river, or ocean, on the side T, of the dam wall C.

In fitting the caissons, I do not mean to confine, or limit myself to the mode shown, of balancing them and the wheel and equipments by chains and weights, but I intend to use any other convenient mechanical means, for such purposes, that may be substantially the same, in practice and effect, and if when new and dry, the caissons have more power of flotation than is required, a small cock may be fitted, to admit so much water, as is needful to load the caissons to the required depth; and when, by any cause, the caissons have too much water in them, or become leaky, a small pump may be fitted into either of them, and be attached, in any convenient way, to the main shaft, and worked so as to keep any such leakage pumped out; and as before premised I do not intend to confine, or limit myself, to the construction of dams, whose length shall be only competent to receive one wheel, with its equipments, but I intend to make the double dam walls, and mill race as long, as the localities of situation will allow, and work any number of wheels, that the dam walls will receive, placing the tide gate at one end, and the current gates at the other end of the dams, whatever their length may be. It will be seen, that with any number of wheels, thus fitted, no interruption will take place in the work, except at the dead low water, or high water of each tide, for the instant the water, on either side the dam, is higher than on the opposite side the tide gate I, will go over to, and close on, the lowest side, and the like effect will take place with the current gate, on that side, the other current gate opening, to pass the water, so that the operations of the tide, alone, will change the gates, and set the wheel, or wheels, in work; and it will be seen, that in cases, where the wheel race shall be over about twelve feet wide, it may be proper to make the tide and current gates in two parts, which may be done, in any convenient and effective manner, and the proportions, between the width and height of the gates, must be regulated by the proportion existing, between the width of race chosen, and the rise and fall of the tide, in the given locality. It may be proper, to protect the tide and current gates from wrecks, or drift wood, on the tide side of the dam, but many well known modes can be chosen for doing this, that it is not needful to describe herein.

I am aware, that tide mills have been proposed, or made, with four gates, to run the water alike, on flood and ebb, and requiring manual attendance, to open and shut them, at the turn of the tide; but no tide mills have, to my knowledge, been proposed, or made, with three self acting gates, and longitudinal dam walls, forming the race, in combination with means to float the wheel, or wheels, and maintain an equality of power, during the flood and ebb; and although the means described, or parts of these described, for regulating the wheel, may have been used before, they have not been used, collectively, in tide races, in the manner proposed herein, therefore I limit my claim as follows:

I claim as new, and of my own invention, and desire to secure by Letters Patent—

1. The mode described of fitting the tide gate I, at one end of a race way, formed by an inner and outer dam wall, in combination with an outer current gate K, and an inner current gate L, at the opposite end of the race way, the whole constructed, and operating, substantially as herein described.

2. I claim the mode of forming the dam walls with pits, open at the bottom, to receive, and float, the caissons that carry the water wheel, and the combination therewith, of the described means for regulating, adjusting, and directing the ascent and descent of the wheel, or wheels, substantially as the same are described and shown herein.

3. I claim the combination of the described mode of fitting the gates, and wheel, or wheels, and making them act together, in the manner described herein.

In witness whereof, I have hereunto set my hand, in the city of New York, this twentieth day of June, in the year one thousand eight hundred and forty-four.

JOHN GERARD ROSS. [L. S.]

Witnesses:
W. SERRELL,
EDWARD W. SERRELL.